US012312845B2

(12) United States Patent
Yalamati et al.

(10) Patent No.: US 12,312,845 B2
(45) Date of Patent: May 27, 2025

(54) QUIET TRIM ASSEMBLY

(71) Applicant: Schlage Lock Company LLC, Carmel, IN (US)

(72) Inventors: Bhargav Yalamati, Hyderabad (IN); Steven Verderaime, Colorado Springs, CO (US); Adam M. Litwinski, Centennial, CO (US); Sundar Raj Dore Vasudevan, Bangalore (IN)

(73) Assignee: Schlage Lock Company LLC, Carmel, IN (US)

(*) Notice: Subject to any disclaimer, the term of this patent is extended or adjusted under 35 U.S.C. 154(b) by 321 days.

(21) Appl. No.: 17/480,820

(22) Filed: Sep. 21, 2021

(65) Prior Publication Data

US 2022/0251887 A1 Aug. 11, 2022

Related U.S. Application Data

(63) Continuation of application No. 16/113,269, filed on Aug. 27, 2018, now Pat. No. 11,124,996.

(51) Int. Cl.

| | |
|---|---|
| ***E05C 1/14*** | (2006.01) |
| ***E05B 7/00*** | (2006.01) |
| ***E05B 9/08*** | (2006.01) |
| ***E05B 15/16*** | (2006.01) |
| ***E05C 1/00*** | (2006.01) |

(52) U.S. Cl.

CPC .................. *E05C 1/14* (2013.01); *E05B 7/00* (2013.01); *E05B 9/08* (2013.01); *E05B 15/16* (2013.01); *E05C 1/004* (2013.01)

(58) Field of Classification Search

CPC ... E05C 1/14; E05C 1/004; E05B 7/00; E05B 9/08; E05B 15/16; E05B 65/1046; E05B 65/106; E05B 65/1073; E05B 17/0012; E05B 17/0041; E05B 17/0045; E05B 2015/0472; E05B 2015/0475; E05B 85/10; E05B 85/103; E05B 85/107; E05B 85/12; E05B 85/13; E05B 85/14; E05B 85/16; E05B 85/18

USPC ........................................................... 292/92

See application file for complete search history.

(56) References Cited

U.S. PATENT DOCUMENTS 2,764,441 A * 9/1956 Marko ...................... E05C 1/14 292/DIG. 31
5,403,047 A * 4/1995 Walls ........................ E05C 1/14 292/336.3

(Continued)

FOREIGN PATENT DOCUMENTS

CN 109958325 A * 7/2019
WO 2013036542 A1 3/2013

OTHER PUBLICATIONS

Allegion; Glynn-Johnson HL6 Installation Instructions; 829694-00; 4 pages; Copyright Allegion 2014.

*Primary Examiner* — Kristina R Fulton
*Assistant Examiner* — James Edward Ignaczewski
(74) *Attorney, Agent, or Firm* — Taft Stettinius & Hollister LLP

(57) ABSTRACT

An exemplary trim assembly includes a mounting bracket and a lever pivotably mounted to the mounting bracket. The lever is pivotable between an actuated position and a deactuated position, and is biased toward the deactuated position. A bumper is mounted to the mounting bracket and engages the lever when the lever is in the deactuated position.

20 Claims, 6 Drawing Sheets

(56) References Cited

U.S. PATENT DOCUMENTS

| | | | | |
|---|---|---|---|---|
| 6,196,599 | B1 * | 3/2001 | D'Hooge | E05C 1/14 292/336.3 |
| 8,746,759 | B2 * | 6/2014 | Bailey | E05B 85/12 292/DIG. 64 |
| 9,039,051 | B2 * | 5/2015 | Shen | E05B 7/00 292/336.3 |
| 2001/0019212 | A1 * | 9/2001 | Fujiwara | E05B 17/0045 292/175 |
| 2006/0261608 | A1 * | 11/2006 | Rusiana | E05C 1/14 292/336.3 |
| 2013/0076046 | A1 * | 3/2013 | Shah | E05B 1/0053 292/336.3 |
| 2015/0076845 | A1 * | 3/2015 | Ou | E05C 1/16 292/358 |
| 2015/0197968 | A1 * | 7/2015 | Shen | E05B 9/08 292/137 |
| 2016/0130846 | A1 * | 5/2016 | Shah | E05C 1/14 292/138 |
| 2017/0275917 | A1 * | 9/2017 | Murphy | E05B 1/003 |
| 2018/0044955 | A1 | 2/2018 | Shah | |
| 2018/0128015 | A1 * | 5/2018 | Shah | E05B 65/1053 |

* cited by examiner

QUIET TRIM ASSEMBLY

CROSS REFERENCE TO RELATED APPLICATIONS

The present application is a continuation of U.S. patent application Ser. No. 16/113,269 filed Aug. 27, 2018 and issued as U.S. Pat. No. 11,124,996, the contents of which are incorporated herein by reference in their entirety.

TECHNICAL FIELD

The present disclosure generally relates to noise-reducing devices for trim assemblies, and more particularly but not exclusively relates to noise-reducing devices for push-pull trim assemblies.

BACKGROUND

Acoustic noise is becoming a growing concern in many different environments, including theaters, auditoriums, schools, libraries, and healthcare settings. Noise is of particular concern in healthcare settings, such as hospitals, nursing homes, and mental health facilities. In healthcare settings, a loud environment can affect the sleep of patients, which can be detrimental to their recovery times. Noise is often one of the lowest scoring items on patient surveys, which can lead to lower reimbursements to the medical facility. In addition to disturbing patients, noise can also be distracting or bothersome to the medical staff, and may lead to loss of focus and errors.

In many settings, door hardware can be a significant factor contributing to undesirable environmental noise. When a person enters or exits a room through a door, the hardware can make loud and distracting sounds. Building codes and other regulatory requirements often dictate that certain doors be equipped with exit devices, which can be louder than certain other types of door hardware. While many manufacturers have made efforts to reduce the noise generated by their devices, certain conventional trim assemblies nonetheless generate noise in excess of the maximum recommended levels set forth in industry guidelines. For these reasons among others, there remains a need for further improvements in this technological field.

SUMMARY

An exemplary trim assembly includes a mounting bracket and a lever pivotably mounted to the mounting bracket. The lever is pivotable between an actuated position and a deactuated position, and is biased toward the deactuated position. A bumper is mounted to the mounting bracket and engages the lever when the lever is in the deactuated position. Further embodiments, forms, features, and aspects of the present application shall become apparent from the description and figures provided herewith.

DETAILED DESCRIPTION OF ILLUSTRATIVE EMBODIMENTS

Figure 1:
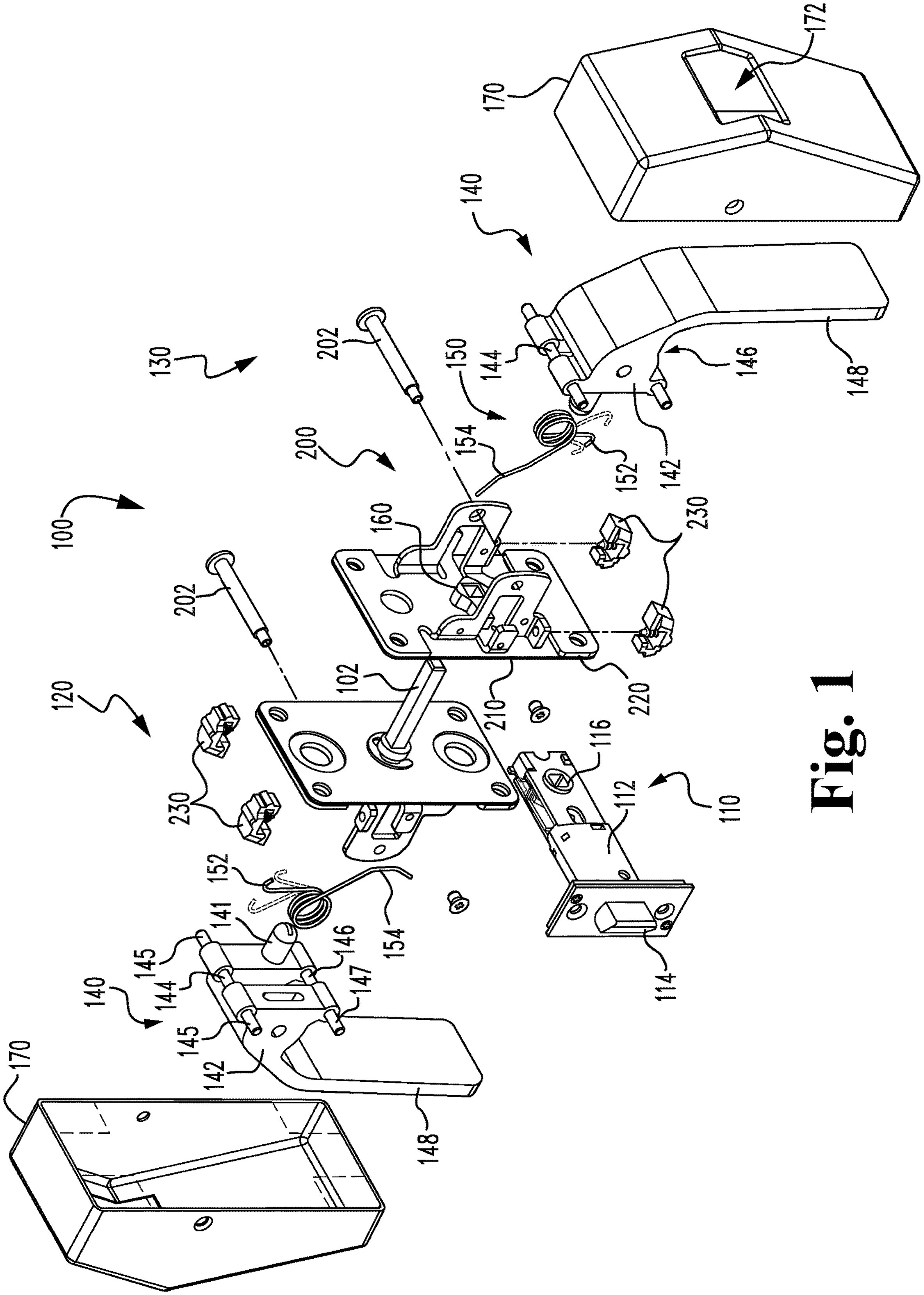
FIG. 1 is an exploded assembly view of a lockset according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to “one embodiment,” “an embodiment,” “an illustrative embodiment,” etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a “preferred” component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of “at least one of A, B, and C” can mean (A); (B); (C); (A and B); (B and C); (A and C); or (A, B, and C). Similarly, items listed in the form of “at least one of A, B, or C” can mean (A); (B); (C); (A and B); (B and C); (A and C); or (A, B, and C). Further, with respect to the claims, the use of words and phrases such as “a,” “an,” “at least one,” and/or “at least one portion” should not be interpreted so as to be limiting to only one such element unless specifically stated to the contrary, and the use of phrases such as “at least a portion” and/or “a portion” should be interpreted as encompassing both embodiments including only a portion of such element and embodiments including the entirety of such element unless specifically stated to the contrary.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

With reference to FIG. 1, illustrated therein is a lockset 100 according to certain embodiments. The lockset 100 generally includes a latching mechanism 110, a push-side trim assembly 120, a pull-side trim assembly 130, and a drive bar 102 that extends along a rotational axis 103 (FIG. 2) and which connects the latching mechanism 110 with the trim assemblies 120, 130. Each of the trim assemblies 120, 130 includes a mounting assembly 200, a lever 140 pivotably mounted to the mounting assembly 200, a biasing member 150 urging the lever 140 toward a home position, a cam 160 coupled to the drive bar 102, and a cover 170 that covers the internal components of the trim assembly 120, 130.

The latching mechanism 110 includes a housing 112, a latchbolt 114 movably mounted in the housing 112, and a retractor 116 rotatably mounted in the housing 112. The latchbolt 114 has an extended position and a retracted position. The latching mechanism 110 biases the latchbolt 114 toward its extended position and biases the retractor 116 to a home position corresponding to the extended position of the latchbolt 114. The latchbolt 114 is operationally coupled with the retractor 116 such that rotation of the retractor 116 from its home position drives the latchbolt 114 from its extended position to its retracted position. The drive bar 102 extends through the retractor 116 and is engaged with each of the trim assemblies 120, 130 such that the drive bar 102 is also biased toward a home position corresponding to the extended position of the latchbolt 114. As described herein, each of the trim assemblies 120, 130 is operable to rotate the drive bar 102 to cause a corresponding rotation of the retractor 116, thereby retracting the latchbolt 114.

The lever 140 generally includes a body portion 142 and first and second stop pins 144, 146 that are positioned on vertically opposite sides of the body portion 142 and which are generally parallel to a pivot pin 202 about which the lever 140 pivots. Each stop pin 144, 146 has a first end and an opposite second end, and the ends of each stop pin 144, 146 define stop members. More particularly, the ends of the first stop pin 144 define a first pair of stop members 145, and the ends of the second stop pin 146 define a second pair of stop members 147. A cam post 141 projects from one side of the body portion 142 and is positioned between the stop pins 144, 146, and a handle portion 148 projects from the opposite side of the body portion 142. The handle portion 148 extends through an opening 172 in the cover 170 such that the handle 148 can be pushed and/or pulled by users to operate the lockset 100.

The body portion 142 of the lever 140 includes an opening 143 through which a pivot pin 202 extends such that the lever 140 is pivotably mounted to the mounting assembly 200. The pivot pin 202 thus defines a pivot axis 203 (FIG. 3) about which the lever 140 is operable to pivot pin 202 between a home or deactuated position and a pivoted or actuated position. As the lever 140 pivots in an actuating direction toward the actuated position, the cam post 141 engages the cam 160 to rotate the drive bar 102, thereby retracting the latchbolt 114. The cam post 141 thus cooperates with the cam 160 to translate pivoting of the lever 140 about the pivot axis 203 to rotation of the cam 160 and the drive bar 102 about the rotational axis 103, which is perpendicular to the pivot axis 203.

The biasing member 150 is provided in the form of a torsion spring having a first leg 152 and a second leg 154. The first leg 152 is engaged with one of the stop pins 144, 146 and the second leg 154 is engaged with the mounting assembly 200 such that the lever 140 is biased in a deactuating direction and toward its deactuated or home position.

Figure 2:
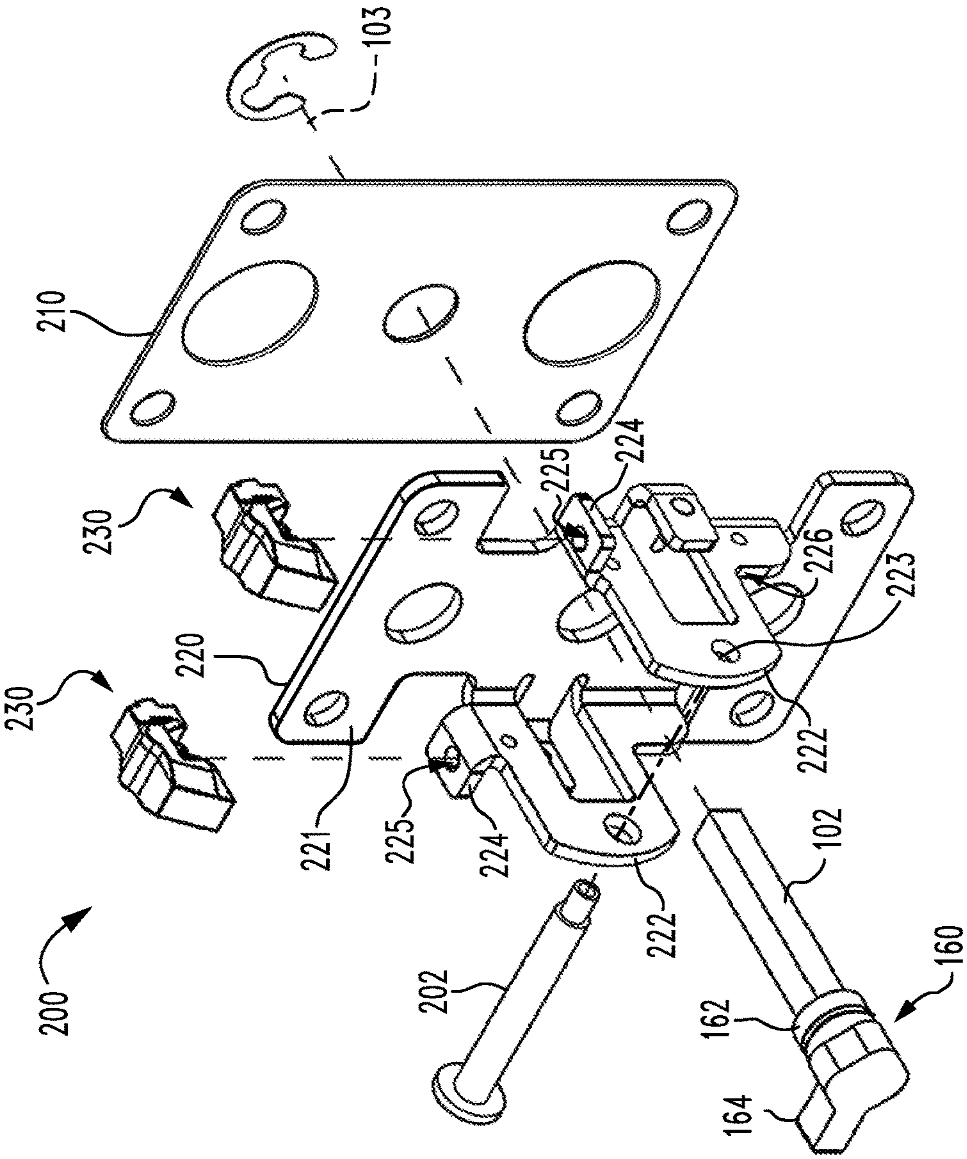
FIG. 2 is an exploded assembly view of a mounting assembly according to certain embodiments.

With additional reference to FIG. 2, the cam 160 is secured to an end portion of the drive bar 102, and generally includes a bearing portion 162 and an armature 164. The bearing portion 162 is generally circular, and the armature 164 extends radially outward with respect to the rotational axis 103 of the drive bar 102. As the lever 140 pivots from its deactuated position in an actuating direction and toward its actuated position, the cam post 141 engages the armature 164 such that the cam 160 and the drive bar 102 rotate about the rotational axis 103.

Figure 3:
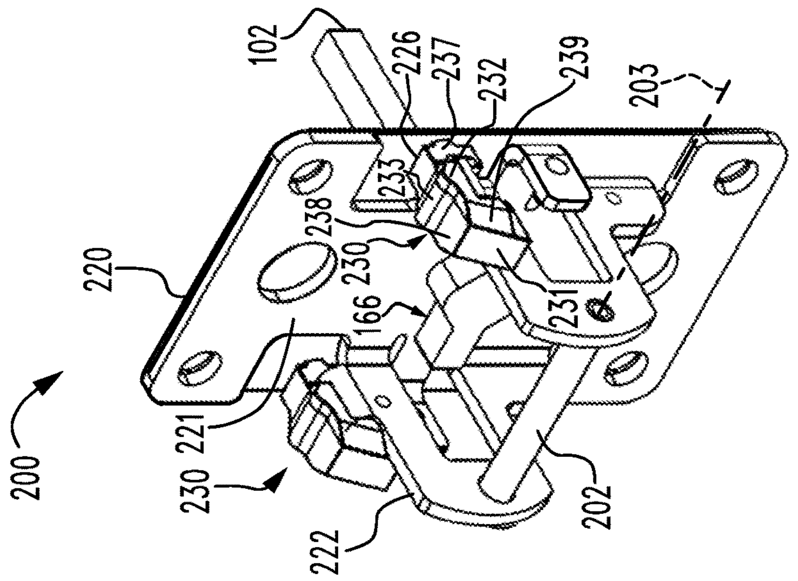
FIG. 3 is a perspective illustration of the mounting assembly illustrated in FIG. 2 in an assembled state.

With additional reference to FIG. 3, the mounting assembly 200 generally includes a base plate 210, a mounting bracket 220 mounted to the base plate 210, and a pair of bumpers 230 mounted to the mounting bracket 220. Each of the base plate 210 and the mounting bracket 220 defines a central opening 212. The bearing portion 162 of the cam 160 is received in the central openings 212 such that the cam 160 and the drive bar 102 are rotatably supported by the base plate 210 and/or the mounting bracket 220.

The mounting bracket 220 includes a plate portion 221 and a pair of spaced-apart arms 222 extending from the plate portion 221. The end portion of each arm 222 defines an opening 223 operable to receive a portion of the pivot pin 202 such that the lever 140 is pivotably mounted to the mounting bracket 220. Each arm 222 also has a tab 224 formed thereon, and defines a landing 226 that is arranged opposite the tab 224. Each tab 224 includes an aperture 225 that facilitates mounting of the bumpers 230 to the tabs 224.

Figure 5:
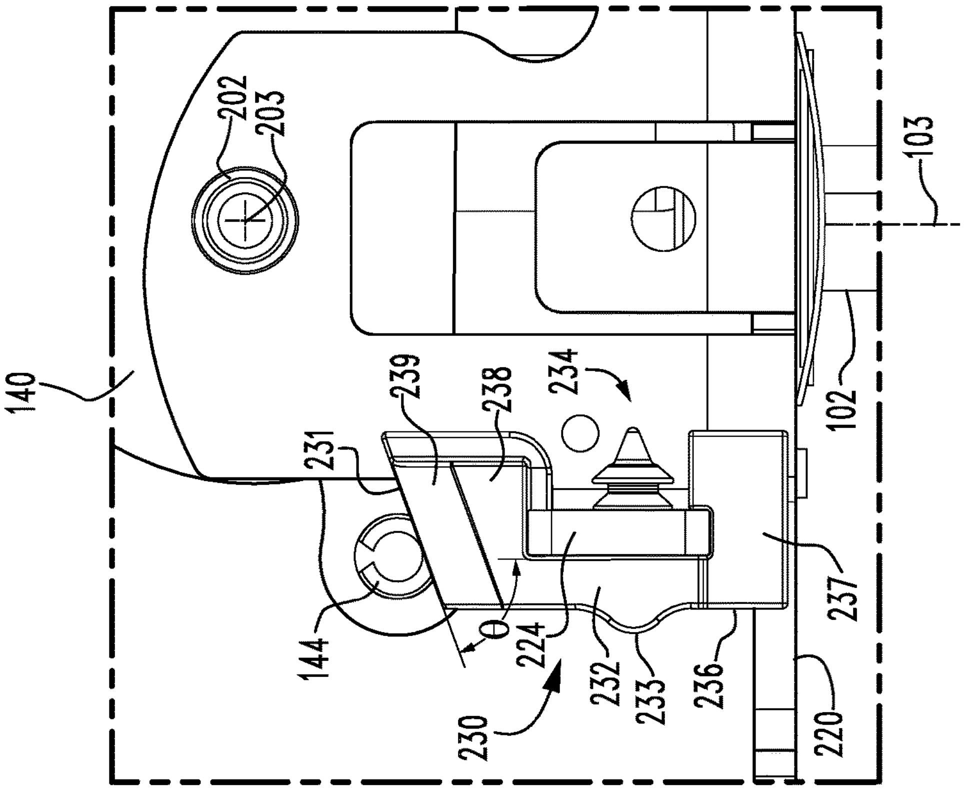
FIG. 5 is a plan view of a portion of the mounting assembly illustrated in FIGS. 2 and 3, including the bumper illustrated in FIG. 4.
Figure 4:
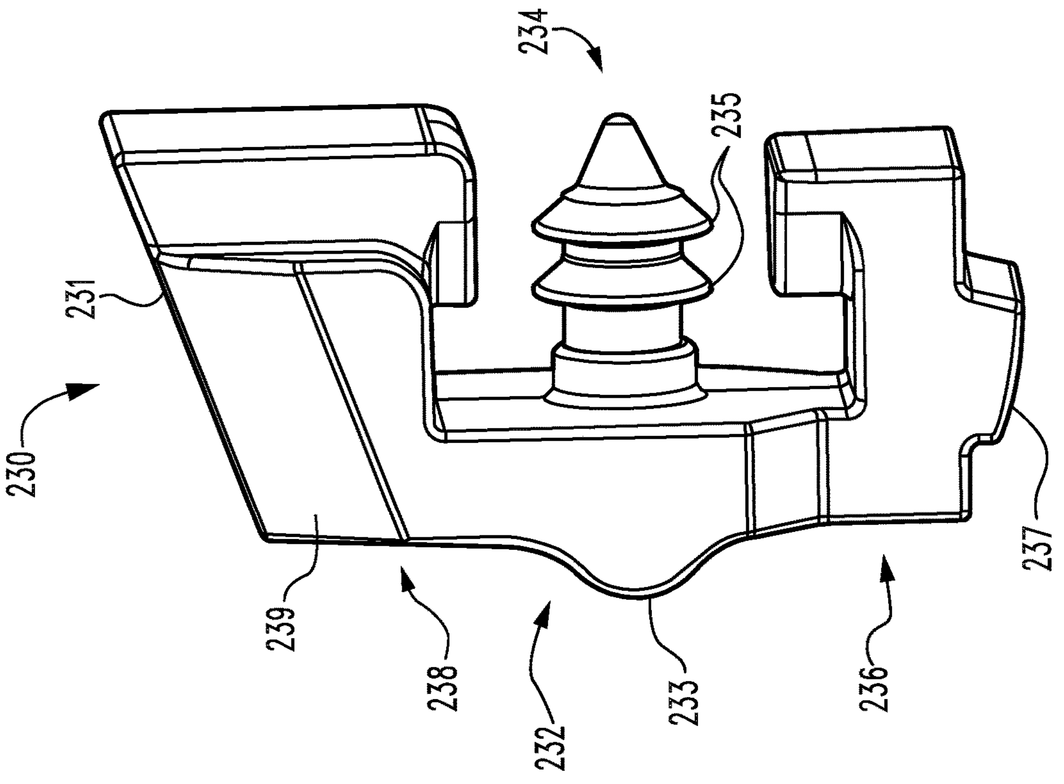
FIG. 4 is a perspective illustration of a bumper according to certain embodiments.

With additional reference to FIGS. 4 and 5, each bumper 230 includes a body portion 232, a post 234 extending from the body portion 232, and a pair of arms 236, 238 positioned on opposite sides of the post 234. The post 234 extends through the aperture 225, and includes one or more annular ridges 235 that engage the rear side of the tab 224 to secure the bumper 230 to the mounting bracket 220. Opposite the post 234, the body portion 232 includes a crest 233 that facilitates the attachment of the bumper 230 to the mounting bracket 220. More particularly, the crest 233 provides the installer with a positive tactile and visual indication of the point at which the post 234 extends from the body portion 232. This may aid in aligning the post 234 with the aperture 225, and indicates the location that should be pressed in order to drive the post 234 into the aperture 225. The crest 233 also increases the amount of material in the vicinity of the post 234, which may increase the strength of the connection between the bumper 230 and the tab 224.

With the bumper 230 installed to the bracket 220, the first arm 236 faces the base plate 210, and the second arm 238 faces the inner surface of the cover 170. The first arm 236 defines a protrusion 237 operable to engage the base plate 210, and the second arm 238 defines a pair of tapered surfaces 239 that engage the cover 170. As described in further detail below, the second arm 238 also defines an angled impact surface 231 that is struck by the lever 140 during operation of the trim assemblies 120, 130.

Figure 7:
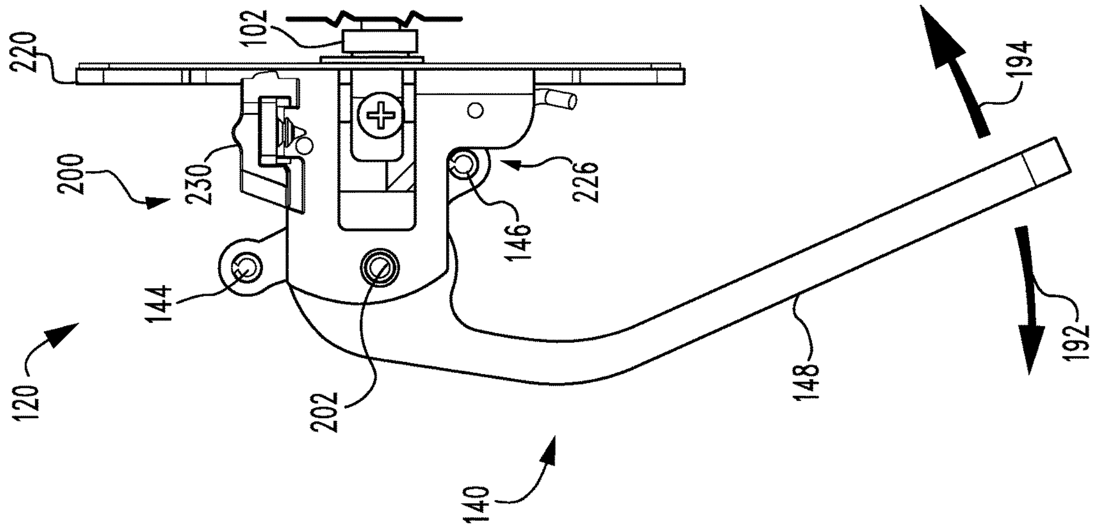
FIG. 7 illustrates the push-side trim assembly of FIG. 6 in an actuated state.
Figure 6:
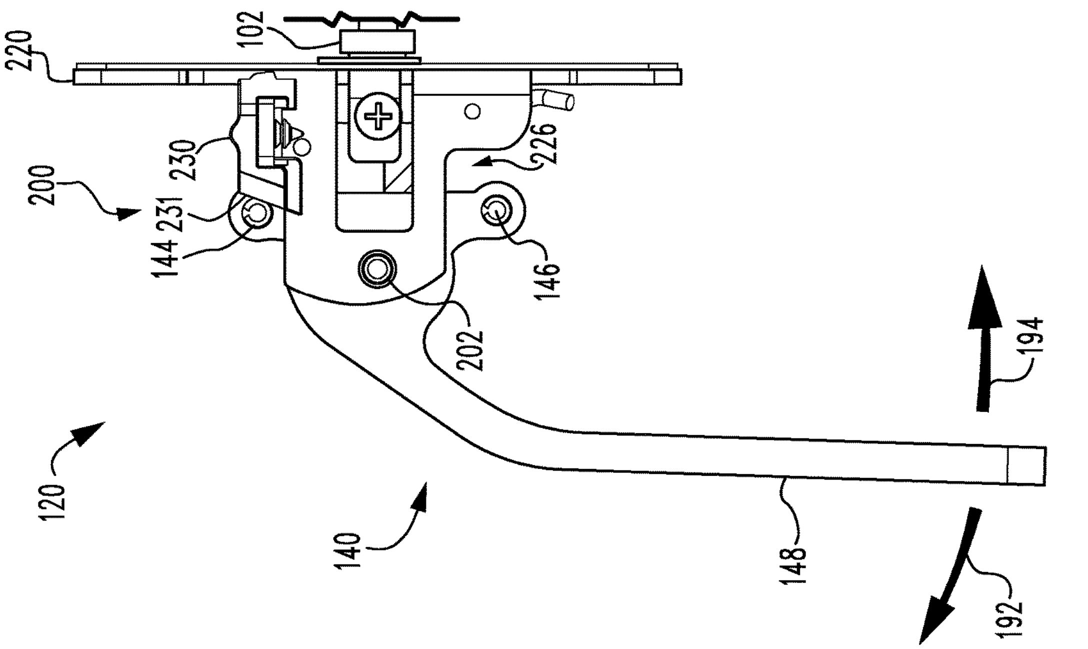
FIG. 6 illustrates a push-side trim assembly according to certain embodiments in a deactuated state.

With additional reference to FIGS. 6 and 7, illustrated therein is the push-side trim assembly 120 during operation of the lockset 100. In the interest of clarity, the cover 170 is omitted from FIGS. 6 and 7. In FIG. 6, the trim assembly 120 is illustrated with the lever 140 in its deactuated position, which corresponds to the extended position of the latchbolt 114. In this state, the first stop pin 144 is engaged with the impact surfaces 231 of the bumpers 230 such that the bumpers 230 inhibit further movement of the lever 140 in the deactuating direction 192 (clockwise in FIGS. 6 and 7). More particularly, each stop member 145 of the first stop pin 144 is engaged with a corresponding and respective one of the bumpers 230. Additionally, the second stop pin 146 is removed from the landings 226 such that the lever 140 is operable to pivot in the actuating direction 194 (counter-clockwise in FIGS. 6 and 7).

When the handle 148 is depressed or pushed inward by a user, the lever 140 pivots about the pivot axis 203 in the actuating direction 194, and the second stop pin 146 approaches the landings 226. In certain embodiments, the landings 226 may engage the second stop pin 146 when the lever 140 is in its actuated position, thereby inhibiting further movement of the lever 140 in the actuating direction 194. In such forms, the landings 226 and/or the stop pin 146 may be provided with a pad and/or a coating to dampen vibrations resulting from such impact. In certain embodiments, the movement of the lever 140 in the actuating direction 194 may be limited by another component such that the movement of the lever 140 in the actuating direction 194 is inhibited before the second stop pin 146 strikes the landings 226. An example of such a limiting component is described herein with respect to FIG. 10.

As the lever 140 pivots in the actuating direction 194 from its deactuated position (FIG. 6) to its actuated position (FIG. 7), the cam post 141 engages the armature 164 such that the cam 160 rotates the drive bar 102 about its rotational axis. Rotation of the drive bar 102 causes a corresponding rotation of the retractor 116, which in turn drives the latchbolt 114 to its retracted position. Thus, depressing the lever 140 of the push-side trim assembly 120 serves to retract the latchbolt 114.

When released from the actuated position (FIG. 7), the lever 140 pivots in the deactuating direction 192 toward its deactuated position (FIG. 6) under the force of the biasing member 150. At the end of this free return, the first stop pin 144 is driven into contact with the impact surfaces 231 of the bumpers 230. The bumpers 230 are formed of an elastomeric material such that the bumpers 230 absorb the energy of the impact and significantly reduce vibrations resulting from the same. This energy is transmitted to the base plate 210 and/or the mounting plate 220 via one or more points of contact with each bumper 230. For example, a first point of contact is formed at the protrusion 237, which has a lesser height than the remainder of the first arm 236 to facilitate compression of the protrusion 237, which aids in absorbing energy. Another point of contact is formed between the tab 224 and the second arm 236, which engages the front edge of the tab 224 as illustrated in FIG. 5. A third point of contact is formed between the post 234 and the tab 224, thereby further increasing the contact area. By providing several points of contact, the bumpers 230 increase the surface area across which the energy is transmitted, which may provide for better sound dampening characteristics.

Figure 9:
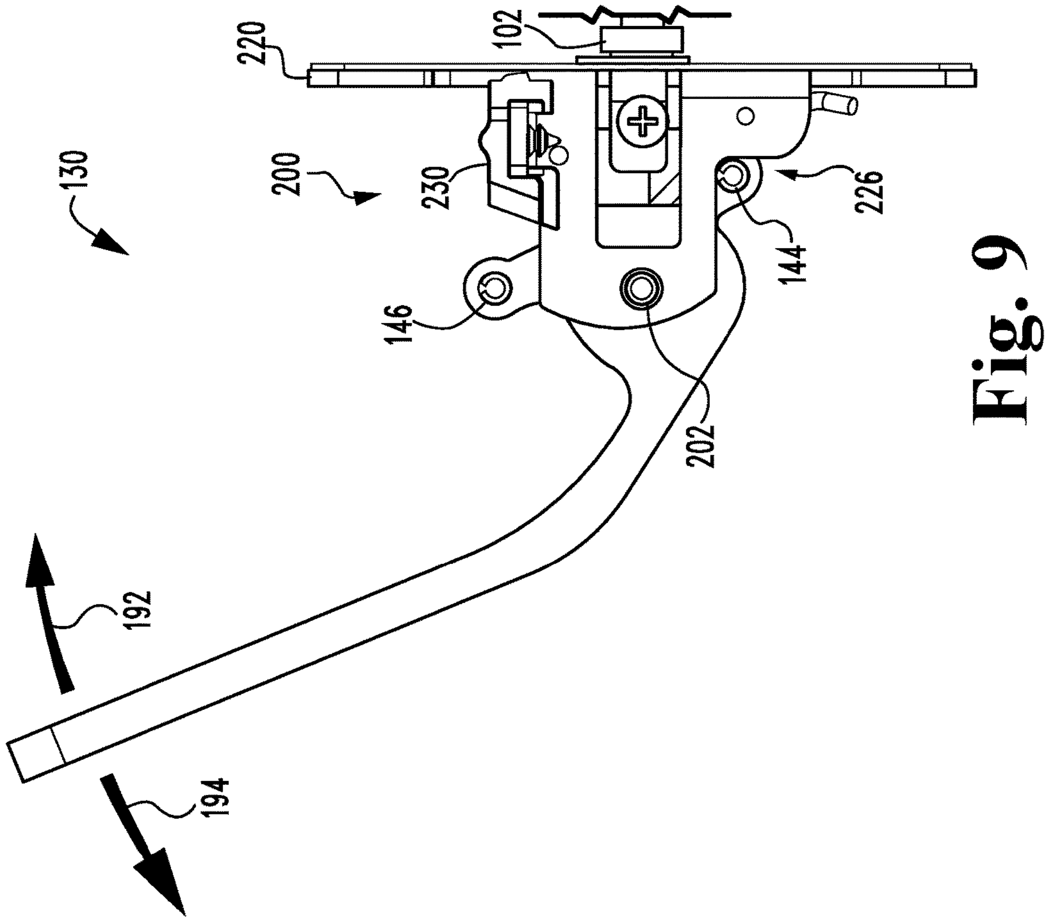
FIG. 9 illustrates the pull-side trim assembly of FIG. 8 in an actuated state.
Figure 8:
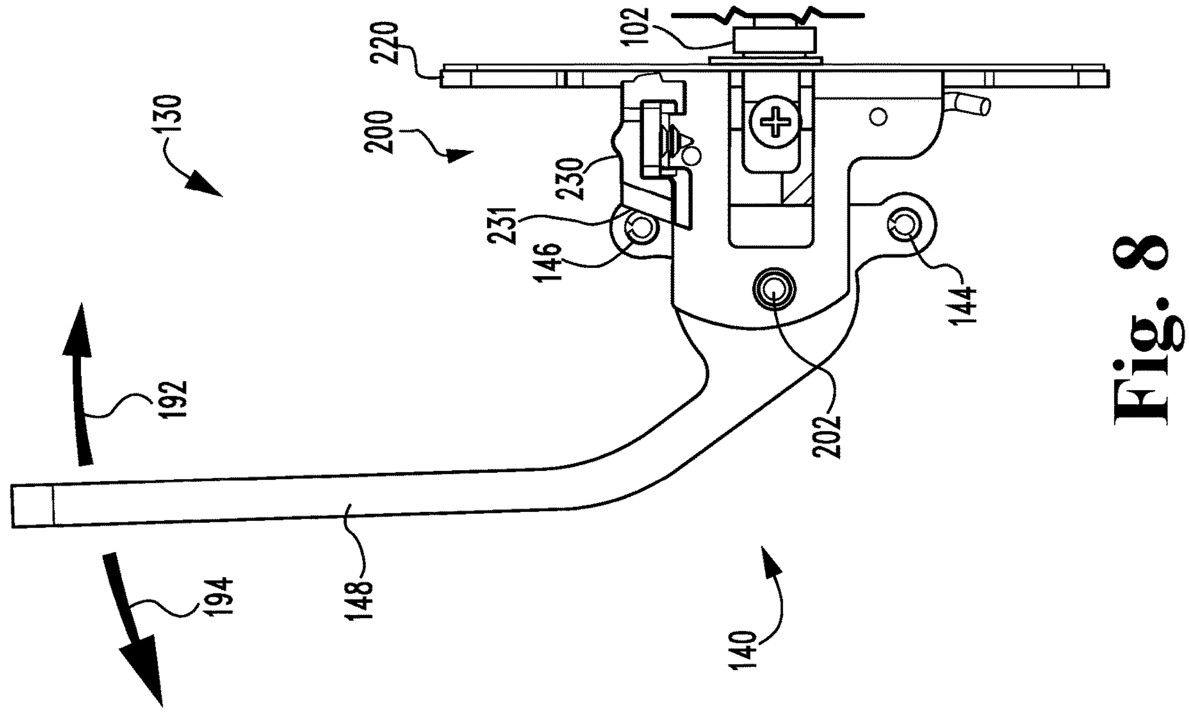
FIG. 8 illustrates a pull-side trim assembly according to certain embodiments in a deactuated state.

With additional reference to FIGS. 8 and 9, the orientation of the lever 140 relative to the mounting assembly 200 is reversible such that the same components can be utilized in both the push-side trim assembly 120 and the pull-side trim assembly 130. Moreover, the lever 140 or the mounting assembly 200 can be rotated 180° about an axis parallel to the drive bar 102 to convert a trim assembly from a push-side trim assembly 120 to a pull-side trim assembly 130. For example, FIGS. 8 and 9 illustrate a pull-side trim assembly 130 in which the lever 140 has been rotated 180° from a first or push-side orientation to a second or pull-side orientation. As a result, the handle portion 148 of the lever 140 now points in a generally upward direction. Those skilled in the art will readily appreciate that the entire trim assembly 130 may be rotated 180° about the rotational axis 103 to the bring the pull-side trim assembly 130 to the orientation illustrated in FIG. 1 without altering the basic operating principles of the trim assembly 130.

Operation of the pull-side trim assembly 130 proceeds in much the same manner as that described above with reference to the push-side trim assembly 120. With the lever 140 in its deactuated position (FIG. 8), the second stop pin 146 is engaged with the bumpers 230 such that the bumpers 230 inhibit further movement of the lever 140 in the deactuating direction 192 (clockwise in FIGS. 8 and 9). More particularly, each stop member 147 of the second stop pin 146 is engaged with a corresponding and respective one of the bumpers 230. Additionally, the first stop pin 144 is removed from the landings 226 such that the lever 140 is operable to pivot in the actuating direction 194 (counter-clockwise in FIGS. 6 and 7).

As the user pulls the handle 148 in the actuating direction 194, the lever 140 pivots about the pivot pin 202, the first stop pin 144 approaches the landings 226, and the second stop pin 146 moves away from the bumpers 230. Such pivoting causes the cam post 141 to engage the armature 164, thereby rotating the cam 160 and the drive bar 102 and retracting the latchbolt 114. When the handle 148 is released, the biasing member 150 drives the lever 140 in its deactuating direction 192, thereby returning the lever 140 to its deactuated position. When the lever 140 reaches the deactuated position, the second stop pin 146 impacts the bumpers 230, which absorb or dampen vibrations resulting from such impact.

As is evident from the foregoing, the bumpers 230 absorb or dampen the vibrations resulting from the free return of the lever 140 from its actuated position to its deactuated position under the urging of the biasing member 150. Various features and characteristics of the bumpers 230 may be selected to deaden this impact such that the lever 140 does not rebound or bounce after striking the bumpers 230. These characteristics and features may also affect the degree to which vibrations are dampened. As one example, softer materials are typically better at absorbing vibrations, but often exhibit poorer resistance to wear. Thus, the material selected for the bumpers 230 is preferably one that is soft enough to dampen vibrations, but hard enough to maintain performance for a desired number of cycles and with irregular handling. Another example is the angle 0231 formed between the impact surface 231 and the horizontal surface of the tab 224. In the illustrated form, the angle 0231 is selected such that the impact surface 231 is perpendicular to the direction in which the stop pin 144 travels as the pin 144 impacts the bumper 230, thereby maximizing the contact area during such impact.

Certain features of the bumpers 230 may also facilitate the installation and maintenance of the lockset 100. For example, the snap fit provided between the post 234 and the tab 224 facilitates the installation of the bumpers 230, as do the tactile and visual indications provided by the crest 233. In addition to facilitating the initial installation of the bumpers 230, these features may also facilitate the replacement of the bumpers 230 when such a time arises.

Figure 10:
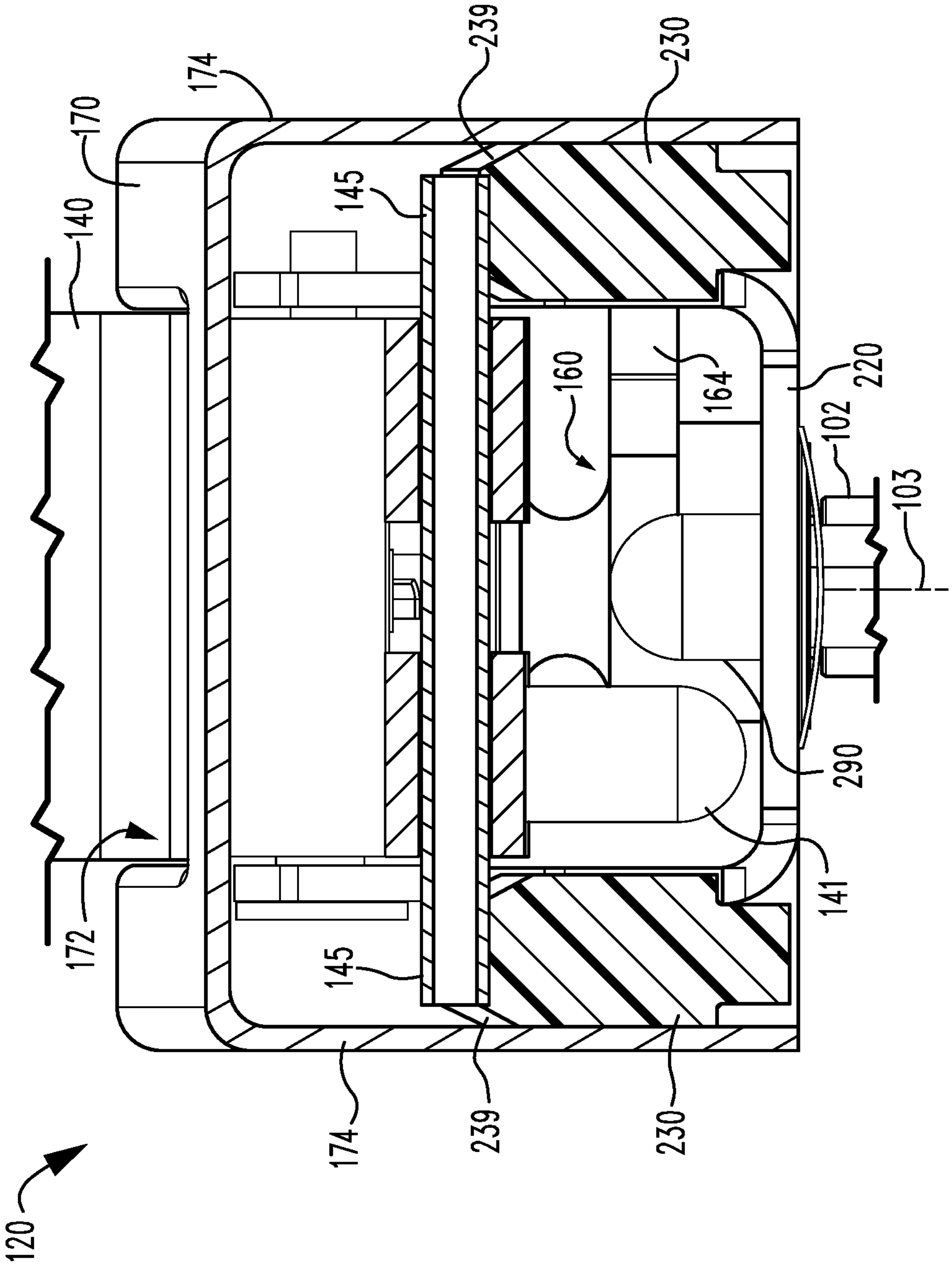
FIG. 10 is a cutaway view of a trim assembly according to certain embodiments.

With additional reference to FIG. 10, the bumpers 230 may further aid in installing the covers 170 to the lockset 100 and reducing noise associated with rattle of the covers 170. The bumpers 230 are sized and shaped such that when mounted to the tabs 224, a portion of each bumper is located outside the footprint of the mounting bracket 220. As the cover 170 is moved into position over the mounting bracket 220, the walls 174 of the cover 170 engage the tapered surfaces 239 and compress the bumpers 230 inward. When so compressed, the bumpers 230 grip the side walls 174 and retain the cover 170 in place, thereby obviating the need to manually retain position of the cover 170 as the cover 170 is secured to the mounting assembly 200 using more permanent fasteners, such as screws or bolts. When the cover 170 is installed, the bumpers 230 also inhibit vibration of the covers 170, which may reduce noise resulting from the cover 170 rattling against the mounting bracket 220 and/or the door.

Also illustrated in FIG. 10 is a cam stop 290 according to certain embodiments. Like the above-described bumpers 230, the cam stop 290 is formed of an elastomeric material and is mounted to the mounting bracket 220. The stop 290 is positioned in the path of the armature 164 such that the stop 290 limits the rotational range of the cam 160. The position of the stop 290 is selected such that the drive bar 102 is free to rotate to the degree necessary to fully retract the latchbolt 114. The position of the stop 290 is also selected such that the cam post 141 drives the armature 164 into engagement with the stop 290 just prior to the point at which the second stop pin 146 would engage the landing 226. Thus, when the lever 140 is in its actuated position, the cam stop 290 inhibits further movement of the lever 140 in the actuating direction 194. The stop 290 thereby halts the progress of the lever 140 before the stop pin 146 impacts the mounting bracket 220, thereby further reducing the noise generated during operation of the lockset 100.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A trim assembly, comprising:
a mounting bracket;
a lever mounted for pivotal movement relative to the mounting bracket;
a cover having at least one side wall defining an interior that receives at least a portion of the mounting bracket; and
a first bumper engaged between the cover and the mounting bracket, wherein the lever is operable to engage the first bumper; and
wherein the first bumper is compressed between an inner surface of the at least one side wall of the cover and the mounting bracket such that the first bumper grips the at least one side wall to aid in retaining the cover in an installed position and reduces rattle of the cover against the mounting bracket.

2. The trim assembly of claim 1, wherein the lever is pivotable between a first position and a second position; and
wherein the lever is configured to engage the first bumper when the lever is in the first position, and is disengaged from the first bumper when the lever is in the second position.

3. The trim assembly of claim 1, further comprising a second bumper engaged between the cover and the mounting bracket.

4. The trim assembly of claim 1, wherein the first bumper is mounted to the mounting bracket.

5. The trim assembly of claim 1, wherein the lever pivots relative to the mounting bracket between a home position and a pivoted position; and
wherein the first bumper is engaged with the lever when the lever is in the home position, and is disengaged from the lever when the lever is in the pivoted position; and
wherein the first bumper is engaged with the inner surface of the cover both when the lever is in the home position and when the lever is in the pivoted position.

6. The trim assembly of claim 1, further comprising a second bumper engaged between the cover and the mounting bracket;
wherein the lever pivots relative to the mounting bracket between a home position and a pivoted position;
wherein the first bumper is engaged with the lever when the lever is in the home position, and the first bumper is disengaged from the lever when the lever is in the pivoted position; and
wherein the second bumper is engaged with the lever when the lever is in the pivoted position, and the second bumper is disengaged from the lever when the lever is in the home position.

7. The trim assembly of claim 6, wherein the first bumper and the second bumper are engaged with the inner surface of the cover both when the lever is in the home position and when the lever is in the pivoted position.

8. The trim assembly of claim 1, further comprising a second bumper engaged between the cover and the mounting bracket; and
wherein the second bumper is compressed between the cover and the mounting bracket such that the second bumper further aids in retaining the cover in the installed position and further reduces rattle of the cover against the mounting bracket.

9. The trim assembly of claim 1, wherein the lever includes a body portion pivotally mounted to the mounting bracket, and a handle portion extending from the body portion and adapted to be manually operated by a user; and
wherein the cover defines an opening through which the handle portion of the lever extends.

10. The trim assembly of claim 1, wherein the first bumper defines a tapered engagement surface that engages the inner surface of the cover.

11. The trim assembly of claim 1, wherein the cover entirely covers the mounting bracket.

12. The trim assembly of claim 1, wherein the cover is retained in position by the first bumper during pivotal movement of the lever relative to the mounting bracket.

13. The trim assembly of claim 1, wherein the first bumper is mounted to the mounting bracket, and wherein the first bumper comprises a deformable post operable to maintain engagement between the first bumper and the mounting bracket.

14. A trim assembly, comprising:
a mounting bracket;
a cover covering at least a portion of the mounting bracket;
a first bumper engaged between the mounting bracket and the cover;
a second bumper engaged between the mounting bracket and the cover;
a lever mounted to the mounting bracket for pivotal movement about a pivot axis between a home position and a pivoted position;
wherein the first bumper is engaged with the lever when the lever is in the home position, and is disengaged from the lever when the lever is in the pivoted position;
wherein the first bumper is engaged with the cover both when the lever is in the home position and when the lever is in the pivoted position; and
wherein the first bumper comprises a post including a deformable ridge operable to maintain engagement between the first bumper and the mounting bracket.

15. A trim assembly, comprising:
a mounting bracket;
a cover covering at least a portion of the mounting bracket;
a first bumper engaged between the mounting bracket and the cover;
a second bumper engaged between the mounting bracket and the cover;
a lever mounted to the mounting bracket for pivotal movement about a pivot axis between a home position and a pivoted position;
wherein the first bumper is engaged with the lever when the lever is in the home position, and is disengaged from the lever when the lever is in the pivoted position;
wherein the first bumper is engaged with the cover both when the lever is in the home position and when the lever is in the pivoted position;
wherein the lever has a first orientation with respect to the mounting bracket, and wherein with the lever mounted to the mounting bracket in the first orientation, the lever has a first deactuated position in which a first portion of the lever is engaged with the first bumper and the second bumper such that the first bumper and the second bumper inhibit further movement of the lever in a deactuating direction; and
wherein the lever has a second orientation with respect to the mounting bracket, and wherein with the lever mounted to the mounting bracket in the second orientation, the lever has a second deactuated position in which a second portion of the lever is engaged with the first bumper and the second bumper that the first bumper and the second bumper inhibit further movement of the lever in the deactuating direction.

16. The trim assembly of claim 15, wherein at least one of the first bumper or the second bumper is secured to the mounting bracket.

17. The trim assembly of claim 15, wherein each of the first bumper and the second bumper is firmly engaged with each of the mounting bracket and the cover.

18. The trim assembly of claim 15, wherein each of the first bumper and the second bumper comprises a corresponding and respective elastomeric material that is compressed between the mounting bracket and the cover.

19. A trim assembly, comprising:
a mounting bracket;
a cover covering at least a portion of the mounting bracket;
a first bumper engaged between the mounting bracket and the cover;
a second bumper engaged between the mounting bracket and the cover;
a lever mounted to the mounting bracket for pivotal movement about a pivot axis between a home position and a pivoted position;
wherein the first bumper is engaged with the lever when the lever is in the home position, and is disengaged from the lever when the lever is in the pivoted position;
wherein the first bumper is engaged with the cover both when the lever is in the home position and when the lever is in the pivoted position; and
wherein each of the first bumper and the second bumper comprises:
a corresponding and respective post through which the bumper is engaged with the mounting bracket; and
a corresponding and respective impact surface extending at an oblique angle relative to the post.

20. A trim assembly, comprising:
a mounting bracket;
a cover covering at least a portion of the mounting bracket;
a first bumper engaged between the mounting bracket and the cover;
a second bumper engaged between the mounting bracket and the cover;
a lever mounted to the mounting bracket for pivotal movement about a pivot axis between a home position and a pivoted position;
wherein the first bumper is engaged with the lever when the lever is in the home position, and is disengaged from the lever when the lever is in the pivoted position;
wherein the first bumper is engaged with the cover both when the lever is in the home position and when the lever is in the pivoted position; and
wherein the first bumper comprises a post including a deformable ridge operable to maintain engagement between the first bumper and the mounting bracket.

* * * * *